United States Patent [19]
Wilson, Sr.

[11] 3,990,568
[45] Nov. 9, 1976

[54] PRESS ROLL SYSTEM FOR SAWING MACHINE

[75] Inventor: Clotis A. Wilson, Sr., Coos Bay, Oreg.

[73] Assignee: Weyerhaeuser Company, Tacoma, Wash.

[22] Filed: Nov. 24, 1975

[21] Appl. No.: 634,954

[52] U.S. Cl. ................................. 198/624; 83/360; 83/422; 144/246 G
[51] Int. Cl.² ......................................... B65G 13/02
[58] Field of Search ................. 198/127 R; 271/263, 271/274; 100/47, 168; 29/111; 83/360, 364, 367; 144/246 G; 83/422

[56] References Cited
UNITED STATES PATENTS

| | | | |
|---|---|---|---|
| 1,309,824 | 7/1919 | Trout | 83/422 |
| 1,967,613 | 7/1934 | Genenger | 198/127 R |
| 3,618,934 | 11/1971 | Germuska | 271/274 |

FOREIGN PATENTS OR APPLICATIONS

| | | | |
|---|---|---|---|
| 788,839 | 1/1938 | United Kingdom | 144/246 G |

Primary Examiner—John J. Love
Assistant Examiner—Douglas D. Watts

[57] ABSTRACT

In a sawing machine of the type having a plurality of press rolls to constrain a traveling workpiece a control system is provided to sequence the press rolls. The thickness of an incoming workpiece is detected as are certain positions of the workpiece. The detected information is utilized to raise the press rolls a predetermined distance above the top surface of the workpiece and to then lower the rolls after the leading end passes under the respective roll. Flexible biasing means are designed into the press roll positioning means in order to accept shock loading and thereby minimize lateral deviation from straight line travel.

9 Claims, 8 Drawing Figures

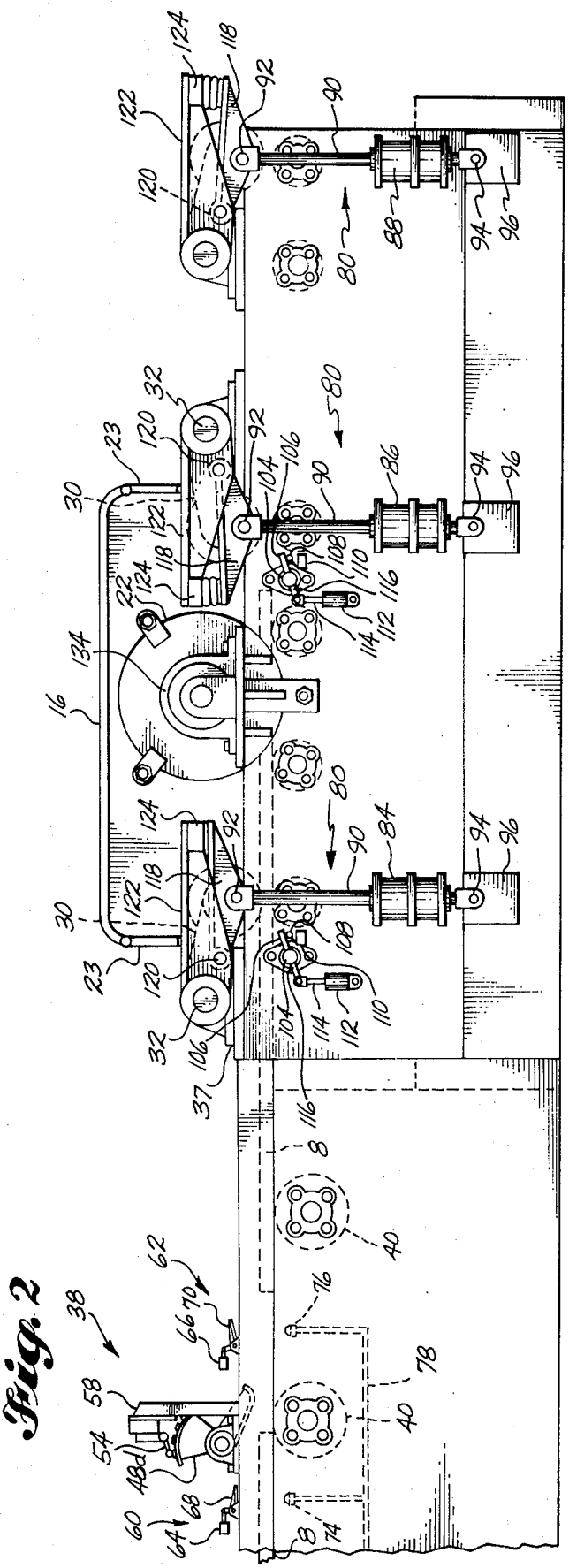

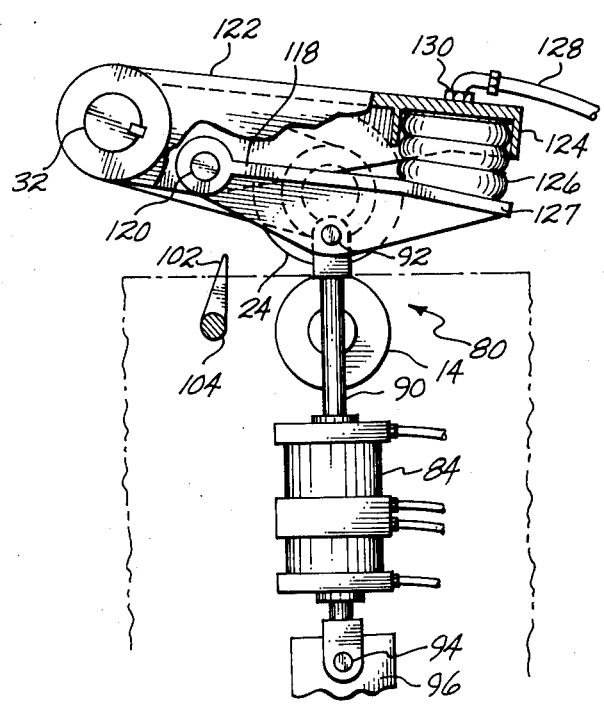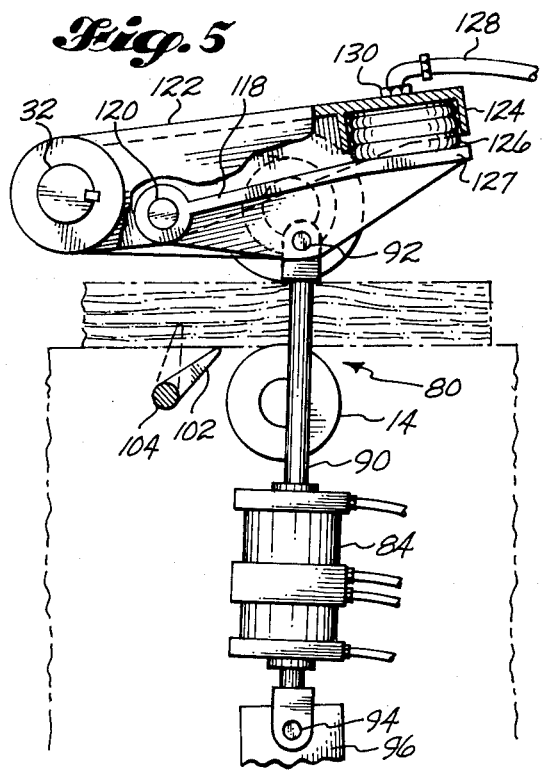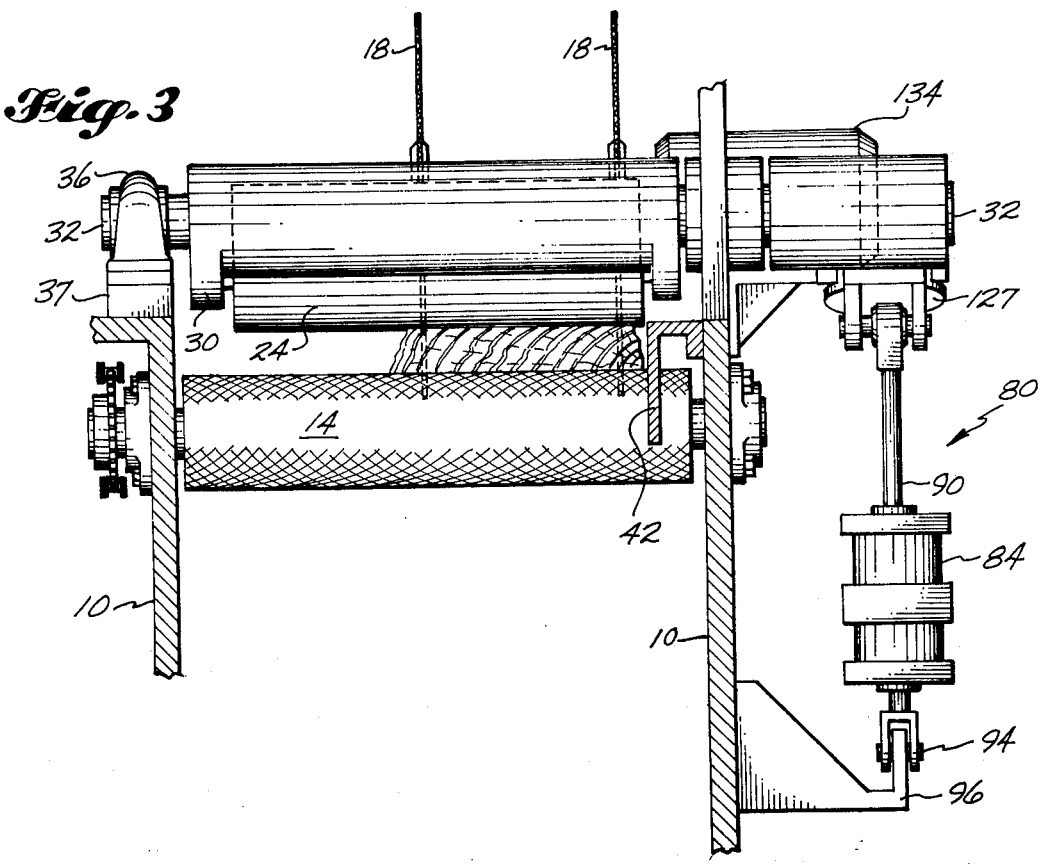

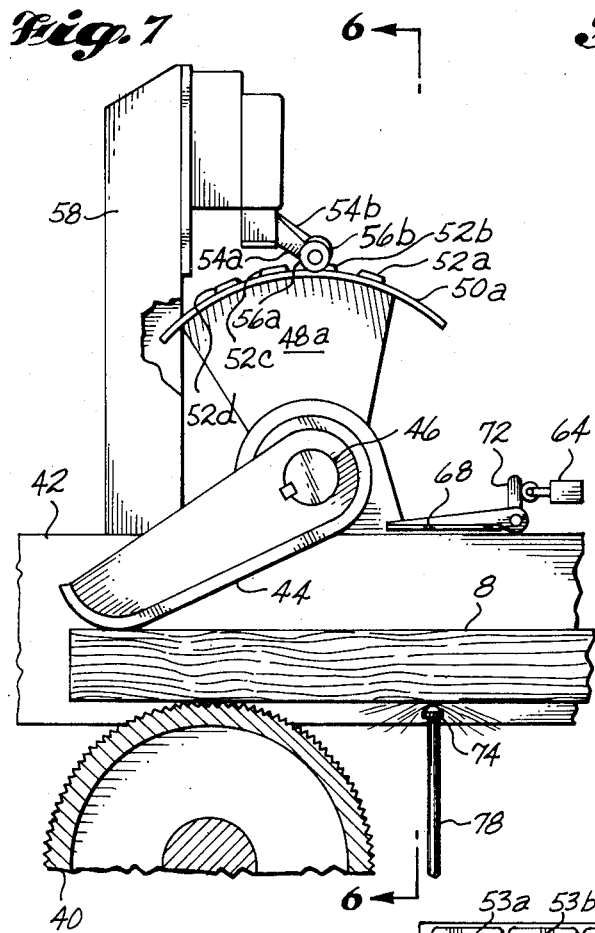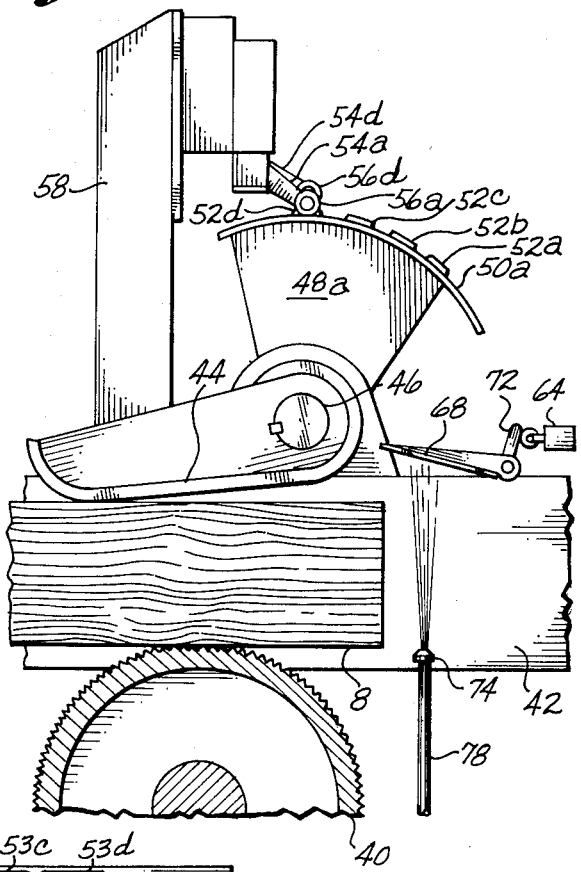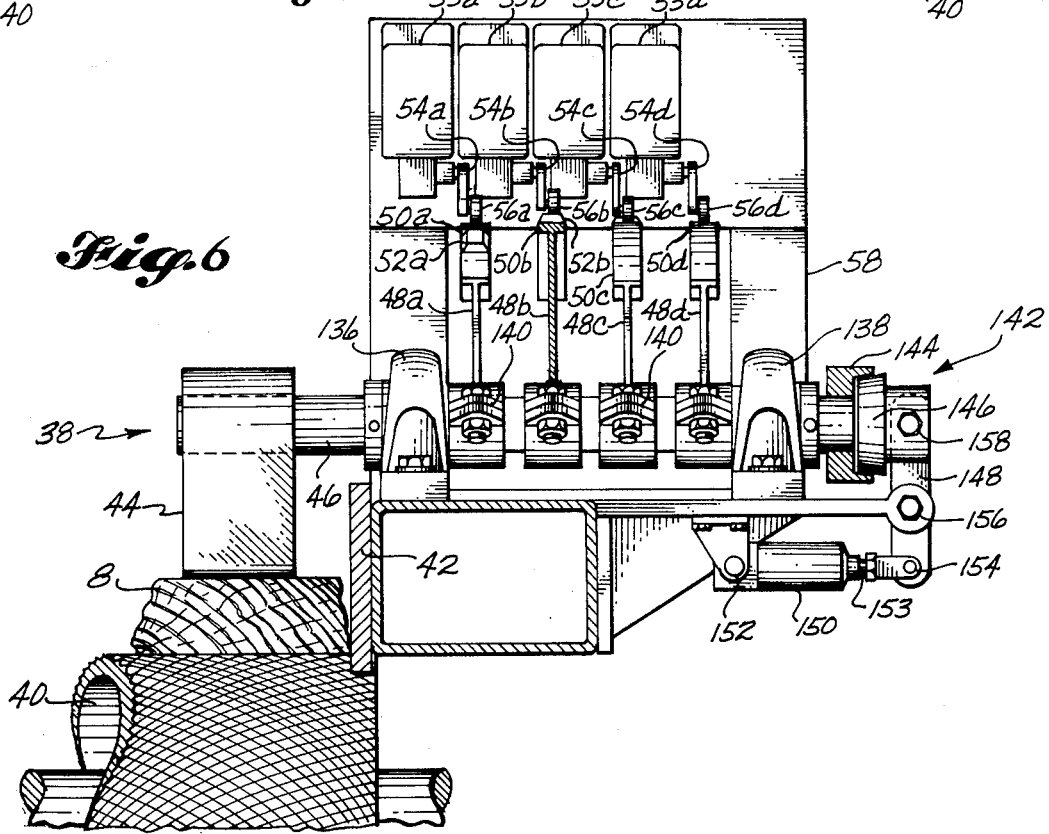

PRESS ROLL SYSTEM FOR SAWING MACHINE

BACKGROUND OF THE INVENTION

This invention relates generally to a sawing machine and more particularly to an improved press roll system for a sawing machine of the type used for longitudinal cutting of pieces such as cants, side boards, or slabs.

In a typical sawmill it is common practice to break a log down at the primary breakdown station into a plurality of elongated pieces. The center piece is typically called a center cant and has two parallel surfaces with the two edges being portions of the log circumference. Usually side boards are also produced at the primary breakdown station and likewise include a pair of parallel surfaces together with a pair of curvilinear edges. Slabs can also be produced at the primary breakdown station and are comprised of pieces having one flat surface together with a curvilinear surface comprising a portion of the log circumference. In further processing of the pieces coming from the primary breakdown station, it is common practice to position the workpiece with one flat side on a reference conveying surface for feeding through the secondary breakdown station which may be comprised of a typical edger, rotary gang, sash gang, or the like.

The function at the secondary breakdown station is to produce generally elongated boards having rectangular cross sections. A typical rotary gang sawing machine will have a plurality of saws mounted on an arbor for making multiple longitudinal rip cuts in a cant, thereby forming the side faces. A plurality of press rolls will normally exert a suitable amount of pressure on the top surface of the cant to hold it firmly against a bottom conveying surface. In a typical edger sawing machine, it is usually the purpose to square up the two opposing edges of an incoming piece to a selected width rather than to break it into a plurality of pieces as in a rotary gang. An edger type sawing machine usually has a pair of saws, one of which is fixed, with the other being laterally adjustable depending upon the maximum width that can be obtained from an incoming piece. Similar to a rotary gang sawing machine, an edger will have a plurality of top press rolls to constrain the incoming piece as it passes through the sawing station. A sawing machine that is suitable for producing a rectangular piece from a slab is generally similar to the just-described sawing machines, except that an additional saw or chipping head is provided in order to produce the additional horizontal surface or side face in order to form the resulting rectangular piece.

In the secondary breakdown sawing machines, when a decision has been made with regard to a cutting pattern for a particular piece, it will then be positioned with respect to a reference plane (usually a fixed saw and line bar) for feeding through the sawing machine. Once the piece has been positioned atop the infeed conveying surface, it is then apparent that accurate straight line travel through the sawing machine is a necessity. Since the sawing action exerts tremendous forces on the traveling piece, it is normally held in position by a plurality of top press rolls which exert a suitable amount of pressure on the top surface as it travels into, through, and out of the sawing machine.

In sawing machines of the type previously noted, the primary design criteria has been a high rate of productivity with a reasonable degree of sawing accuracy. In the past, it has been a normal occurrence that when the rate of production (feed rate) is increased, correspondingly a reduction in accuracy will result. By accuracy it is meant that after a piece is positioned with respect to a reference plane, it is then cut with the minimum degree of variation from straight and parallel lines of cut. With regard to increasing productivity while maintaining or actually increasing accuracy, little regard or attention has been given to the press roll system.

One cause of inaccurate cuts in existing systems is due to the fact that an incoming piece must physically lift those press rolls that then exert the constraining pressure on the top surface. At the high rates of speed of the incoming boards, as is required to maintain a high rate of productivity, the impact of a board hitting a press roll can cause a misalignment resulting in the problem with inaccurate sawing. This problem is particularly prevalent when small pieces are fed through an edger-type sawing machine where the impact of a small piece hitting a large press roll is very likely to cause a deviation from the intended travel path. When a plurality of press rolls is encountered during the feeding and sawing process, the misalignment may be compounded due to the board hitting several additional press rolls prior to the finished piece exiting the sawing machine. It is apparent that in such a situation the sawing accuracy is greatly affected, and a large amount of waste may occur due to improperly cut boards.

In the prior art, there are several examples of sawing machines that have a plurality of press rolls which are essentially automatically positioned in response to a sensed thickness of an incoming piece. For example, in the British patent 788,839, a press roll system is described wherein a thickness sensing arm detects the thickness of an incoming board which then serves to control the height of the press rolls above the horizontal feeding plane of the sawing machine. The position of the press rolls, however, is always such that their lowermost edges are slightly lower than the upper surface of the incoming board. With this system, the incoming board will still necessarily impact the press rolls in order to raise them, thereby affording an opportunity for misalignment of the board. Another example of a prior art system is that disclosed in the patent to McMillan, U.S. Pat. No. 3,742,992, in which the thickness of an incoming piece is sensed in order to set a plurality of press rolls.

One of the main problems with raising and lowering or sequencing of press rolls, while attempting to increase or maintain sawing accuracy, is to maintain a reasonable rate of production through the sawing machine. Accordingly, a sawing system that is to be designed for high accuracy sawing should also have as a design criteria the maintenance of a high production rate. It is therefore apparent that an improved press roll system should necessarily be designed for automatic operation. Suitable sensing means will detect the required parameters and then act to control the respective positions and sequencing for the press rolls. With such a system, one obvious design criteria is to provide the least amount of movement of the operating parts for a given incoming piece. In this respect, a memory means is desirable to recall the parameters of the preceding piece, such that if the next incoming piece has the same parameters, the press rolls will already be in position and thereby require little movement.

Another problem in prior art sawing systems having press rolls is that of misalignment caused by aberrations on an incoming piece impacting a particular press roll and causing misalignment. In several prior art systems, solutions to this problem have been suggested which generally include a flexible biasing means associated with the press rolls such that any shock load as a result of an aberration hitting the press roll will be effectively absorbed by upward movement of the press roll. It has been found in designing the improved press roll system for combined high-speed operation and elimination of misalignment caused by the board impacting the press rolls, that the aforementioned flexible bias means could be designed into the system by utilizing an air cushion separating the individual press roll from its positioning mechanism. with such a feature, each press roll is allowed to rise individually in order to pass over knots or other irregularites that might occur on the top surface of an incoming piece. It is apparent that this feature will allow for the effective feeding and sawing of slabs or other miscut pieces of lumber which are being remanufactured.

Another feature that must be designed into sawing machines of the type utilizing press rolls is the continuous pressing function, primarily for safety purposes. It is essential that when a piece is being fed through the sawing station a minimum number of press rolls be exerting an appropriate amount of pressure to hold the workpiece in its path of travel. If an incoming piece is not properly held, there is a likelihood of saw damage and also creation of the extremely hazardous condition of lumber possibly being ejected from the machine. Thus it becomes a design criteria to provide that the minimum number of press rolls always be atop a piece being cut. This condition becomes somewhat difficult to maintain when incoming pieces of varying thicknesses are to be cut with no interruption in the feed rate. Again, it becomes necessary to provide a fast-acting, well-timed system to properly position and control in sequence the press rolls.

Due consideration must also be given to the complexity of the overall design in view of reliability and the available maintenance personnel in sawmills. Sawmills are notorius for their rugged operating environment, and any newly designed piece of equipment must necessarily be capable of reliable operation in the rough environment. Consequently, mechanical limit switches and hardwired control circuits are desirable. In addition to their reliability, such hardwired systems lend themselves to relatively easy maintenance in the sawmill environment.

Accordingly, from the foregoing, one object of the present invention is to provide an improved sawing machine press roll system for more accurate feeding of the pieces through the sawing station.

Another object of the invention is to provide a press roll system where each individual press roll will absorb the shock loading from contacting a protuberance on the piece.

A further object of the present invention is to design an improved press roll system that is essentially automatic in operation, allowing high feed rates through the sawing machine.

Still a further object is to provide a simple memory means whereby succeeding pieces of similar thickness can be accommodated with minimal movement of the press rolls, thereby reducing machine wear.

An additioonal object of the invention is to provide an improved press roll system and control therefor that will operate with a high degree of reliability in the rough environment of a sawmill.

Still a further object of the present invention is to provide an improved press roll system where maintenance can be performed by existing sawmill maintenance personnel in a minimum time period.

These and other objects of the invention will become apparent upon reading the specification to follow in conjunction with the attached drawing.

SUMMARY OF THE INVENTION

Briefly, the present invention is practiced in one form by providing means to sense the thickness of an incoming workpiece and means responsive to that signal to set the press rolls of a sawing machine. The press rolls are set to a position that is slightly above the top surface of the incoming workpiece and then as the leading end of the piece nears each press roll, its presence will be sensed and a signal generated which will then control means to lower each press roll in sequence to a position atop the piece. Each press roll is flexibly biased against the workpiece so any shock loading from a protrusion on an individual piece will be accepted without causing a deviation in straight line travel.

BRIEF DESCRIPTION OF THE DRAWINGS

FIG. 2 is a view similar to FIG. 1 only looking at the opposite side of the sawing machine, and shows the positioning mechanism for the individual press rolls.

FIG. 3 is a section view taken along line 3—3 of FIG. 1 and shows the first press roll in position atop a workpiece.

FIG. 4 is a detailed cut-away side view of the press roll and its positioning mechanism at rest with flexible biasing means in the extended position.

FIG. 5 is a view similar to that shown in FIG. 4, but shows the press roll and its positioning mechanism in a position where the press roll is on the top surface of a traveling piece.

FIG. 6 is a cross-sectional view taken along line 6—6 of FIG. 7 and shows in detail the thickness sensing station.

FIG. 7 is a side elevation view showing an incoming piece activating the sensing arm to generate a signal corresponding to the particular thickness.

FIG. 8 is a view similar to FIG. 7 and shows the thickness sensing arm atop a piece having a greater thickness than the piece in FIG. 7.

DESCRIPTION OF THE PREFERRED EMBODIMENT

Figure 1:
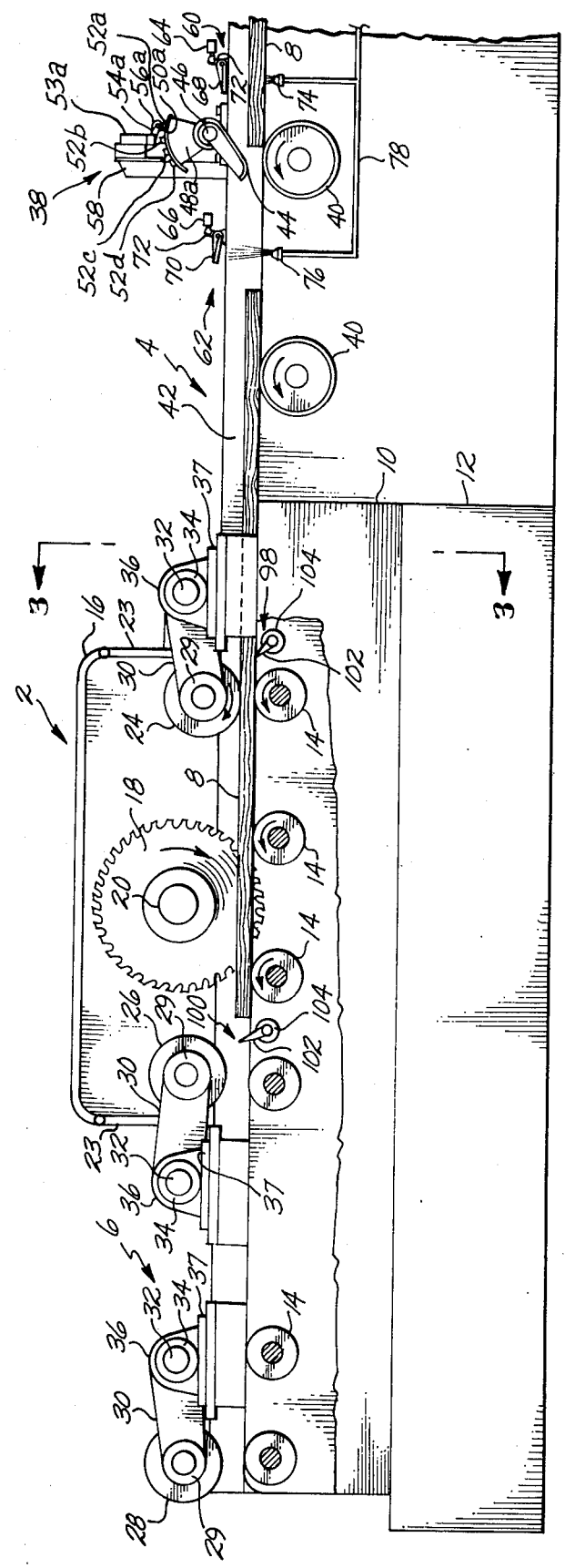
FIG. 1 is a side elevation view partially cut away showing the thickness sensing station and the sawing station together with the individual press rolls.

Referring first to FIGS. 1 and 2, a general description will be given of a well-known sawing system within which environment the present invention may be utilized. The sawing machine depicted in FIGS. 1 and 2 may be of the type commonly referred to in the industry as a board edger and includes a sawing station 2, infeed section 4, and an outfeed section 6. As is well known by those skilled in the art, an edger has as its function the squaring up of the two edges of each incoming board or workpiece 8. By "squaring up" it is meant that an incoming workpiece having at least one rough edge and which may be wider than the standard board width but less than the next higher standard board width is reduced to the maximum sized board having a rectangular cross section. Supporting the overall sawing machine are the generally vertical sidewalls indicated as 10 which extend upwardly from base member 12. Extending between the vertical sidewalls 10 is a plurality of longitudinally spaced bottom feed rolls, each being indicated at 14. Collectively, the feed rolls 14 form a generally horizonal conveying surface through the sawing machine on which workpiece 8 travels.

Enclosing the sawing station 2, primarily for safety reasons, is an enclosure 16. Of course, confined within the enclosure 16 are the saws 18. The saws are mounted on a laterally extending arbor 20 and are adapted to be shiftable in the lateral direction in order to vary the width of cut and position of cut. While round saws are depicted in the several figures, other working tools could be utilized such as chipper heads, band saws, or the like. At the sawing station 2 the saws are mounted on arbor 20 such that at the bottommost point on their periphery they extend below the plane of the conveying surface formed by feed rolls 14. Offering easy access to the cutting tools and other structure contained within enclosure 16 is access port 22 and end hatches 23. Access port 22 and hatches 23 are normally closed during operation but can be easily opened for saw changes, various adjustments, and the like.

At sawing station 2 there are at least first and second press rolls indicated respectively at 24 and 26, one of which is positioned upstream from saws 18 and the other of which is positioned downstream from saws 18. An additional third press roll 28 is positioned further downstream from saws 18 and generally above outfeed section 6. Of course, it will be understood by those skilled in the art that the general function of the press rolls is to exert sufficient amount of pressure on the top of a workpiece so as to constrain it in its direction of travel. This function is provided to assure accurate travel and therefore accurate cuts during operation.

Each of the press rolls 24, 26, and 28 are positioned such that they will generally be in vertical alignment with one of the bottom feed rolls 14. Each press roll is mounted within bearings 29 which are in turn mounted at the ends of laterally spaced pivotal arm members 30. The pivotal arm members 30 are in turn fixed to a rotatable shaft 32. The rotatable shaft 32 is in turn mounted in suitable bearings 34. Bearings 34 are mounted in bearing housings 36 which are each fixed within mounting structure 37 positioned slightly above the plane of travel for the workpiece. The mounting structures 37 are, of course, positioned in a laterally spaced relationship so as to allow for the passage of the workpiece through the sawing machine.

Positioned upstream from the first press roll 24 and its cooperating bottom feed roll 14 is the primary sensing station indicated generally at 38. As will be understood by those skilled in the art, the thickness of unedged boards can be variable within a range of from something less than one inch to four inches and above. The sensing station 38 is located from press roll 24 a distance that is suitable to allow for thickness sensing and actuation of the control to set each press roll height as based on the speed of travel of an incoming workpiece. Spaced longitudinally between the sawing station 2 and the sensing station 38, and additionally for some distance upstream therefrom, is a plurality of laterally extending infeed rolls 40, one of which is positioned directly beneath sensing station 38. Of course, the primary function of infeed rolls 40 as for feed rolls 14 is to support an incoming workpiece 8 in its proper horizontal plane of travel and to act as a reference plane for thickness sensing purpose. Infeed rolls 40 are powered by any suitable variable speed drive means (not shown) as are the bottom feed rolls 14 in order to provide the driving force and necessary speed to the workpiece as it enters sensing station 38 and continues through sawing station 2.

The incoming workpiece prior to entering sensing station 38 is caused to move laterally to a position abutting a longitudinally extending line bar 42. An upstream mechanism to cause such travel can be of any suitable type such as skewed feed rolls or traversely moving chains. Line bars are typically used in sawing machines in order to provide a longitudinally extending reference plane for directing a workpiece in proper alignment through the sawing station. Line bar 42, as will be clear by referring to FIG. 3, does extend longitudinally from a position upstream of sensing station 38 through sawing station 2, thereby providing a reference plane throughout the travel of the workpiece.

At sensing station 38 a pivotal thickness sensing arm 44 is mounted on a laterally extending rotatable shaft 46. As will be described in greater detail later, thickness sensing arm 44 is adapted to be pivoted upwardly or downwardly depending on the thickness of an incoming workpiece. Also mounted on the same rotatable shaft 46 as sensing arm 44 is a plurality of cam mounting arms 48a–48d, each of which has a curvilinear tracking element 50a–50d respectively mounted along the top edge thereof. Appropriately positioned on its respective tracking element is an actuating cam 52a–52d protruding from the curvilinear surface. A plurality of limit switches 53a–53d is mounted above the curvilinear tracking elements 50a–50d and each limit switch has depending from the bottom thereof a pivoting arm 54a–54d and a cam follower 56a–56d adapted to follow its respective curvilinear tracking element. Supporting limit switches 53a–53d in a laterally spaced relationship, each being in line with its respective curvilinear tracking element, is a mounting frame 58.

Also at the sensing station 38 are a pair of first and second end position sensing means 60 and 62. Position sensing means 60, 62 are also comprised of limit switches indicated respectively at 64 and 66 and serve to generate signals indicating the presence of the leading and trailing ends of a workpiece. Serving to actuate limit switches 64, 66 are pivoting arm members 68, 70, each of which has fixed to it a limit switch driving arm 72. As seen when referring to FIGS. 1 and 2, the limit switches and pivoting arms are positioned above the incoming workpiece with the first position sensing means 60 being slightly upstream from thickness sensing arm 44, while the second position sensing means 62 is slightly downstream from sensing arm 44.

Serving to turn the pivoting arms 68, 70 is the pressure exerted on each by a jet of air being directed vertically upward from a nozzle positioned below the workpiece. A pair of such nozzles 74, 76 is positioned directly below each of the arms 68, 70 and is supplied through a common air line 78, which is in turn connected to a source of compressed air (not shown). It is apparent that when a workpiece is not interrupting the flow of air from either nozzle 74 or 76, the air jet will impinge on the bottom surface of pivoting arm 68 or 70 and cause it to pivot upwardly about its pivot point. The control function of each limit switch 64, 66 will be described in detail later; however, it is pertinent here to note the relative longitudinal position of each switch with respect to thickness sensing arm 44.

Looking now at the opposite side of the overall sawing machine as depicted in FIG. 2, the general structure of the press roll positioning means, each being generally indicated at 80, will be described. Each positioning means 80 is comprised partly of a modified lever arm mechanism fixed to one end of the same rotatable shafts 32 that serve to turn the arm members 30. Acting to turn the lever arm mechanisms through a controlled angle and thereby controlling the settings of press rolls 24, 26, and 28, are the first and second actuating cylinders 84 and 86, and the downstream or third press roll actuating cylinder 88. The lever arm mechanisms will be described in greater detail when referring specifically to FIGS. 3–5; however, for present purposes it is sufficient to say that the ram 90 of each actuating cylinder is connected to its modified lever arm at a pinned connection point 92. At the opposite ends of actuating 84, 86, and 88, they are connected through pinned connection means 94 to base members 96. As will be noted in FIG. 2, the cylinders extend upwardly from base 8 in the vertical direction. As an alternative, the actuating cylinders could be suspended from above; however, the supporting structure would necessarily be more complicated.

Another part of the sensing and control system is comprised of third and fourth suitable position sensing means 98 and 100 respectively, located just upstream from each press roll 24, 26. While the sensing means 98, 100 could be comprised of any device suitable for sensing the presence of the leading and trailing end of a workpiece, the present embodiment is comprised of a pivotal sensing arm 102 mounted on a rotatable shaft 104 which is positioned transversely to the direction of travel of a workpiece. As an incoming workpiece contacts a sensing arm 102 which is positioned so as to be directly in line with the workpiece, it will be deflected downwardly, thereby rotating shaft 104. Fixed to one end of the shaft 104 and adapted to rotate therewith is a cam surface 106. Adapted to follow the cam surface 106 is cam follower 108 which in turn serves to actuate a limit switch 110. The limit switch 110 generates a signal indicating the presence of the leading end of the workpiece and also indicates when the workpiece has passed the sensing arm 102. In order to positively return the sensing arm 102 to a position ready for the next incoming workpiece, an actuating cylinder 112 with an attendant ram 114, serves to pivot a lever arm 116 which is fixed to rotatable shaft 104.

Thus it should be noted that a plurality of sensing means is provided not only to indicate the thickness of each workpiece, but also to indicate the presence at critical points of a workpiece in order to properly control the movements and sequencing of the plurality of press rolls 24, 26, and 28.

Turning now to the remaining figures of the drawing, additional detail will be described of the positioning means 80 and the thickness sensing means, together with additional details of the operating sequence as provided by the overall control system. The end of each ram 90 through its pinned connection point 92 is operatively connected to a first pivoting arm member 118. Arm member 118 can pivot about pinned connecting means 120 relative to a second pivotal arm member 122 which is fixed to the rotatable shaft 32.

It will thus be apparent that whenever the second arm member 122 is caused to pivot, the first arm member 118 may or may not be rotated about its pinned connection means 120. The second pivotal arm member 122 extends outwardly generally in a longitudinally direction from the rotatable shaft 32 and has on the outer end thereof a substantially circular retaining well 124 for holding and retaining a flexible, extensible, and compressible gas holding means such as an air bag 126. The outer end of pivoting arm member 118 has a circular bearing member 127 thereon for allowing the bottom surface of air bag 126 to releasably bias against it when arm member 118 is in certain positions. The air bag 126 in operation acts to control the variable distance between the outer ends of pivoting arm members 118 and 122. A source of gas, such as air, under pressure is provided through flexible line 128 to air bag 126 at entry point 130. The amount of air within air bag 126 at any given point in the operating cycle is controllable by the overall control system. It may be seen by referring to FIGS. 4 and 5 that when pressurized air is allowed to extend the air bag 126, the distance between the outer ends of arm members 118 and 122 will be increased while when the air is released, the air bag will deflate and the minimum distance will be decreased. Such action serves to raise and lower the press rolls approximately one-half inch as will be apparent later. Additionally, when air bag 126 is extended and arm member 118 is pivoted further away from arm 122, the air bag will simply be lifted from bearing member 127, but will be retained in proper position by well 124. Air bags are well known and are frequently used for absorbing various shock loads within sawing machines, and a commercially available example of such an air bag is one manufactured and sold by the Firestone Tire and Rubber Company.

As will be seen by referring to FIG. 3, the sawing station 2 has two laterally spaced saws 18 mounted on arbor 20. Serving to turn arbor 20 is a suitably positioned and sized motor 134. Both saws 18 are laterally shiftable with the saw nearest the line bar 42 being shiftable in increments of approximately ¼ inch in order to place a proper edge on the side of the workpiece adjacent the line bar. The other saw is, of course, shiftable to a lateral position that will produce an edge board having the maximum obtainable width of a standard size.

Turning now to FIGS. 6–8, additional details of the thickness sensing station 38 will be described. As previously noted, the thickness sensing arm 44 is mounted on a rotatable shaft 46. The end of rotatable shaft 46 to which sensing arm 44 is attached is an extension of the shaft outwardly from one of its supporting bearings 136. Extending along the rotatable shaft 46 from bearing 136 to the other supporting bearing 138 is the plurality of cam mounting arms 48*a*–48*d*, each fixed to rotating shaft 46 through suitable mounting means 140. Also, as previously noted, the cam mounting arms 48*a*–48*d* extend vertically upward and terminate with the curvilinear tracking element attached to each end thereof. The tracking elements 50*a*–50*d* form a common longitudinally extending curvilinear plane that is generally parallel to rotatable shaft 46. On each tracking element 50*a*–50*d* an actuating cam 52*a*–52*d* is appropriately positioned in order to initiate a signal through the respective limit switch for indicating the particular thickness of a workpiece. Each actuating cam is positioned successively along the common curvilinear plane to correspond with the amount of rotation of the shaft 46, and hence the vertical position of thickness sensing arm 44. For example, in the present embodiment four basic thicknesses of incoming, unedged boards may be detected. It will be readily apparent that other thicknesses could also be detected; however, the instant embodiment includes the capability for measuring one, two, three, and four inch pieces. If, for example, a one inch board passes under thickness sensing arm 44, it will rotate shaft 46 and the cam mounting arms 48a–48d through an angle that will bring the first or one inch cam 50a into contact with its corresponding cam follower 56a, thereby actuating the respective limit switch to indicate that the thickness of the piece is one inch. The first actuating cam in the structure just mentioned will be that on the far right of FIG. 7, or conversely that on the far left in FIG. 6.

At the end of rotatable shaft 46 opposite thickness sensing arm 44, is a shaft holding device indicated generally at 142. Holding device 142 functions to hold the shaft 46 in a given position which is determined by the overall control system and essentially acts to hold thickness sensing arm 44 in the same position as caused by the previous piece until a new piece passes beneath it, at which point the control system will release holding device 142 so that sensing arm 44 is free to pivot. Holding device 142 is comprised of a circular brake drum 144 mounted on the end of shaft 46. A corresponding brake shoe 146 is adapted to move laterally into and out of engagement with brake drum 144 through the force exerted on pivoting lever arm 148 as caused by actuating cylinder 150. Cylinder 150 is mounted below rotatable shaft 46 at pinned mounting means 152 with the ram 153 thereof being connected to one end of lever arm 148 at pinned connection point 154. The lever arm 148 is mounted at its central point on pivot point 156 and at its other end through pinned connection point 158 to the brake shoe 146. Such a shaft holding device 142 is therefore operable to hold rotatable shaft 46 in a particular orientation when brake shoe 146 is engaged with brake drum 144. Conversely when brake shoe 146 is released, the rotatable shaft 46 will be allowed to rotate about its axis.

Operation of the Invention

Turning now to a description of the operation, one operating sequence of the present invention will be described. The following specific example will be described in order to show the sequencing operation; first, a relatively thin unedged board will be directed toward the infeed section such as one on the order of two inches thick, then one on the order of four inches thick will be directed to the infeed section, and finally an unedged board on the order of three inches thick will be directed to the infeed section. It is noted that the specific dimensions being indicated are given by way of example only and one skilled in the art could easily adjust or modify the system in order to process a wide variation of workpiece thicknesses.

The first step will be accomplished upstream from the first position sensing means 60 and includes having the two inch unedged positioned against line bar 42 ready to be fed forward toward the thickness sensing station. In this initial beginning mode, the plurality of press rolls are in their down positions, and the thickness sensing arm 44 is in its down position. In addition, the pivoting arms 68, 70 forming a portion of the position sensing means are being forced upwardly by the uninterrupted air flow whereby the shaft holding device 142 is acting to lock thickness sensing arm 44 in its down position. Thus the actuating cylinder 150 will be extended, thereby forcing the brake shoe 146 against the brake drum 144. With the thickness sensing arm 44 in its lowermost position, each of the curvilinear tracking elements 50a–50d will be at their starting positions with all of the cam followers 56a–56d likewise being in their down positions ready for tracking along their respective tracking elements. As would also be expected, the sensing arms 102 of the position sensing means 98, 100 are in their up positions awaiting a first board. The press rolls 24, 26, and 28, as previously mentioned, are in their down positions as caused by rams 90 being in their retracted positions, thereby having the first pivotal arm members 118 in their down positions. The extensible air bags 126 are then pressurized, causing second pivotal arm members 122 to move upwardly carrying the press rolls to a higher vertical position with respect to arm members 118. With this particular configuration of the positioning means 80, it will be appreciated by those skilled in the art that if the ram 90 of each press roll actuating cylinder was then caused to move vertically upward, such movement would cause the press roll through the air bag 126 to advance to a higher vertical position with respect to the horizontal conveying surface.

Also, prior to feeding the first two inch unedged board, saw motor 134 will be activated as will the power means for driving bottom feed rolls 14 and infeed rolls 40.

All elements of the overall sawing machine are in a position ready to receive the first incoming unedged board having the two inch thickness. A command signal sends the board toward infeed section 4 where its leading end first interrupts the flow of pressurized air from nozzle 74, thereby causing the pivoting arm 68 to pivot downwardly actuating limit switch 64. Limit switch 64 sends a disengaging signal to actuating cylinder 150 which releases shaft holding device 142 allowing the rotatable shaft 46 and depending thickness sensing arm 44 to freely rotate so that the bottom contacting surface of sensing arm 44 will come to rest on the top surface of the incoming board. This position of the unedged board just entering the thickness sensing station 38 is best seen by referring to FIG. 7. Since the two inch board has a suitable amount of weight and inertia, it will easily pivot thickness sensing arm 44 to a position corresponding to the thickness of the incoming board, thereby rotating shaft 46 and the plurality of curvilinear tracking elements 50a–50d. Since the first actuating cam 52a represents the one inch thickness, its cam follower 56a will simply pass over the top and come back to rest on its respective tracking element 50a. However, since the second actuating cam 52b will represent the two inch thickness, its cam follower 56b will come to rest atop cam 52b, thereby actuating its respective limit switch 53b. The two inch limit switch mechanically establishes a circuit within the control system for setting the height of the press rolls when activated to a position approximately ½ inch above the top surface of the two inch unedged board.

As the leading end of the incoming board breaks the air jet from the second nozzle 76, it will actuate limit switch 66 indicating the longitudinal position of the leading end of the board with respect to the press rolls. At the same instant limit switch 66 is actuated, it sends the signal to the control mechanisms serving to activate the first and second actuating cylinders 84, 86 and downstream actuating cylinder 88. At this time each cylinder positions its respective press roll to the approximate ½ inch distance above the two inch dimension of the incoming board. As will be apparent to those skilled in the art, the longitudinal distance between the second position sensing means 62 and the first press roll 24 will be sufficient to allow enough time for press rolls to be properly positioned to the predetermined distance above the incoming board.

As the board continues to travel longitudinally, its leading end will next contact the sensing arm 102 at the third position sensing station just upstream from first press roll 24. Since the sensing arm 102 will cause shaft 104 to rotate thus actuating the respective limit switch 110 indicating the presence of the board, a signal will be sent to the controlling mechanism for the first press roll positioning means 80. This particular signal allows the control mechanism for the gas holding means to deflate the air bag 126, thereby allowing the second pivotal arm member 122 to rotate downwardly through an angle which in terms of vertical distance will equal the approximate ½ inch height above the board. Since the second pivotal arm member 122 is fixedly attached to the same rotatable shaft 32 as press roll 24, the press roll will drop the approximate ½ inch to contact the top surface after the leading end has just passed under the press roll. It will be appreciated that at this position the incoming board now has one press roll constraining it in its direction of travel and such constraint has been placed on the board after the leading end passed below in its prealigned condition.

The board then passes through the saws 18, both of which have been set based on the maximum width obtainable from the unedged board. This configuration may best be seen by referring to FIG. 3. The leading end of the thusly edged board continues in the longitudinal direction and then contacts the sensing arm 102 at fourth position sensing means 100 just upstream from the second press roll 26. The sensing arm 102 acting similar to that at sensing means 98 causes a signal to be generated which is sent to the control mechanism for actuating the second positioning means 80 and the downstream positioning means 80 for controlling actuating cylinder 88. This particular signal in a similar manner serves to release the pressure within the gas holding means 126 associated with press roll 26, thus allowing the press roll to descend the approximate ½ inch to contact the board after its leading end has passed under the press roll. At the same time, the pressure is released in the holding means 126 of the positioning means at the downstream press roll 28. Since the board, at this point, already has two press rolls constraining it in its movement, the downstream press roll can be lowered prior to the leading end passing beneath it without resulting in any misalignment. However, a sensing arm similar to those ahead of the upstream press rolls could be positioned just upstream of the last press roll 28 in order to independently lower it the approximate ½ inch.

When a pess roll is atop the traveling board, the associated air bag 126 serves as a flexible cushion to accommodate any knots or other irregularities near the top surface of the board. For example, if a large protrusion contacted a press roll, it would deflect upwardly independently of the others by the particular air bag 126 simply lifting off the bearing member 127 and would then, after the protrusion passed, return to its normal position with the air bag absorbing the shock load. The provision of the air bags 126 will also allow for variations in thickness of an incoming board from any of the given thickness settings.

As the trailing end of the two inch board passes upstream nozzle 74, pivoting arm 68 will rotate upwardly whereby limit switch 64 will send a signal to actuating cylinder 150 causing the shaft holding device 142 to lock the thickness sensing arm 44 at the two inch position. This in effect acts as a mechanical memory system so that if the next incoming unedged board is another two inch piece, the thickness sensing arm will already be set to that thickness. As the trailing end passes the position sensing means 62, the press roll control system is then ready to set the press rolls for the next incoming board. However, the individual press rolls will still remain on the top surface of the two inch board being edged. As the trailing end passes the sensing arm 102 at position sensing means 98 allowing it to pivot upwardly, the signal thusly generated will cause the press roll 24 to be raised the approximate ½ inch distance above the two inch thickness. The actual movement, prior to the end of the board passing beneath press roll 24, is caused by the extensible gas holding means 126 being filled with air pressure, thereby rotating the second pivotal arm member 122 upwardly and consequently the press roll 24. As the trailing end passes the sensing arm 102 of the second position sensing means 100, the press rolls 26 and 28 are correspondingly raised ½ above the two inch thickness. Thus the thickness sensing arm and the several press rolls are all positioned in readiness for another incoming unedged board having a two inch thickness. The next incoming unedged board will be four inch thick piece.

Essentially the same operation takes place for a four inch piece except that the thickness sensing arm and the several press rolls will start from positions that are raised from the condition where no board had previously passed through the sawing machine. The leading end of the four inch board will interrupt the air jet from nozzle 74, thereby releasing the holding device 142 allowing the thickness sensing arm 44 to freely rotate upwardly to the four inch thickness. During the rotation of the thickness sensing arm, the respective curvilinear tracking element 50$d$ having the four inch actuating cam thereon will move to its forwardmost position such that the cam follower 56$d$ actuates the four inch limit switch 53$d$. The leading end then passes through the air jet from nozzle 76, thereby generating a signal for the press roll actuating cylinders calling for the four inch setting plus the approximate ½ inch additional distance provided by the extensible gas holding means 126. At this point, if the preceding two inch board is still within sawing station 2, neither the press rolls nor arm members 118 will move and each press roll will remain atop the preceding piece until the trailing end has passed through the respective position sensing means 98 and 100. Once the sensing arm 102 of the position sensing means 98 returns to its upstanding position, the press roll 24 will then automatically be positioned to the four and one-half inch distance above the horizontal conveying surface and similarly with the sensing arm at position sensing means 100. When the leading end of the four inch unedged board impacts the sensing arm at position sensing means 98, the press roll 24 will then descend the approximate ½ inch to contact the top surface, thereby constraining the four inch piece in its direction of travel.

The next incoming unedged board will be a three inch piece and when it enters sensing station 38, it will activate the respective limit switches in the same manner as the previous boards. The only exception with the three inch piece is that once the shaft holding device 142 is unlocked, the thickness sensing arm 44 will rotate downwardly to a position so as to contact the top surface of the three inch board, thereby mechanically setting the electrical circuit so the several press roll actuating cylinders will be set to a three inch board as soon as sensing station 62 is actuated a split second later. When the leading end of the three inch piece reaches position sensing means 98, the air bag having been inflated when the trailing end of the preceding piece passed and the press roll having begun its descent, it will signal the control system to deflate the air bag so the press roll can then descend to a position atop the three inch piece.

Another feature that may be included as a part of the overall control system is means to generate a signal based on the thickness of an incoming unedged board in order to control the speed of the board through the sawing station. For example, boards having a thickness of one and two inches can be edged at a faster rate than boards having a thickness of three or four inches. Thus when thickness sensing arm 44 contacts a one or two inch board, a signal could serve to speed up the bottom feed rolls 14 so as to feed the board through the sawing station at a speed on the order of 450 feet per minute, while a three or four inch board would be fed through on the order of 300 feet per minute.

Thus it should be appreciated that a high-speed, essentially automatic sequencing press roll system has been described for use in various sawing machines. The sequencing press roll system serves to prevent misalignment of prealigned traveling boards while at the same time accepts shock loads due to aberrations in a particular board.

While a detailed example of the principal embodiment has been described, it is understood that many changes and modifications may be made in the above-described press roll sequencing system without departing from the spirit of the invention. All such modifications are intended to be included within the scope of the appended claims.

What is claimed is:

1. A machine of the type having a work station for machining incoming workpieces that have at least one substantially flat surface for continuous contact with a conveying surface through the machine and at least first and second top press rolls, the first being upstream from the work station and the second being downstream from the work station, for constraining a traveling workpiece in its prealigned direction of travel, having the improvement comprising:

means located upstream from the first press roll for sensing the thickness of each incoming workpiece;

means in response to the sensed thickness to position the press rolls a predetermined distance above the top surface of each incoming workpiece;

means positioned just upstream from the first and second press rolls to sense the presence of the leading end of each workpiece; and means responsive to the sensed presence of the leading ends of each workpiece for lowering in sequence the press rolls to a position where they contact the top surface of the workpiece after its leading end has passed below the respective press roll.

2. The machine as in claim 1 further including:

means positioned just upstream from the first and second press rolls to sense the presence of the trailing end of each workpiece; and means responsive to the sensed presence of the trailing end of each workpiece for raising the press rolls to the predetermined distance above the top surface before the trailing end of each workpiece passes beneath the respective press roll.

3. The machine as in claim 1 in which the thickness sensing means is comprised in part of a pivotal thickness sensing arm fixed to a rotatable shaft with the sensing arm being disposed in line with the direction of travel of the workpieces and has means to generate signals indicative of the thickness of each incoming workpiece.

4. The machine as in claim 1 in which the press roll positioning means is activated in response to the sensed presence of the leading end of a workpiece at a position just downstream from the thickness sensing means.

5. The machine as in claim 1 in which the thickness sensing means has means for recalling the thickness of the immediately preceeding workpiece.

6. The machine as in claim 1 in which the press roll positioning means includes a modified lever arm fixed to the rotatable shaft on which the pivotal support arms of each press roll are fixed together with an actuating cylinder operatively connected to the lever arm for setting the distance above each workpiece of the respective press roll.

7. The machine as in claim 6 in which the modified lever arm is comprised of a first pivoting arm member to which is attached the actuating cylinder connected to a second pivotal arm member fixed to the rotatable shaft on which the press roll is mounted with the arm members at their outer ends being separated by a movable, extensible and compressible gas holding means.

8. The machine as in claim 7 in which the gas holding means is comprised of an air bag.

9. The machine as in claim 1 further including a third top press roll similar to the first and second press rolls and positioned downstream from the second press roll.

* * * * *

UNITED STATES PATENT OFFICE
CERTIFICATE OF CORRECTION

Patent No. 3,990,568  Dated November 9, 1976

Inventor(s) Clotis A. Wilson, Sr.

It is certified that error appears in the above-identified patent and that said Letters Patent are hereby corrected as shown below:

In column 3, line 13, "with" should read --With--;

in column 3, line 15, "irregularites" should read --irregularities--;

in column 3, line 41, "notorius" should read --notorious--;

in column 3, line 65, "additioonal" should read --additional--;

in column 4, line 30, "mechanism" should read --mechanisms--;

in column 6, line 1, "purpose." should read --purposes.--;

in column 6, line 11, "traversely" should read --transversely--;

in column 7, line 64, "connecting" should read --connection--;

in column 8, line 3, "longitudinally" should read --longitudinal--;

in column 8, line 43, "edge" should read --edged--;

in column 9, line 60, "unedged positioned" should read --unedged board positioned--;

UNITED STATES PATENT OFFICE
CERTIFICATE OF CORRECTION

Patent No. 3,990,568      Dated November 9, 1976

Inventor(s) Clotis A. Wilson, Sr.

It is certified that error appears in the above-identified patent and that said Letters Patent are hereby corrected as shown below:

in column 11, line 7, "for press" should read --for the press--;

in column 11, line 59, "pess" should read --press--; and in column 12, line 28, "1/2 above" should read --1/2 inch above--.

*Signed and Sealed this*

*second* Day of *August 1977*

[SEAL]

Attest:

RUTH C. MASON
*Attesting Officer*

C. MARSHALL DANN
*Commissioner of Patents and Trademarks*